(12) United States Patent
Vetters et al.

(10) Patent No.: US 11,313,233 B2
(45) Date of Patent: Apr. 26, 2022

(54) TURBINE VANE ASSEMBLY WITH CERAMIC MATRIX COMPOSITE PARTS AND PLATFORM SEALING FEATURES

(71) Applicants: Rolls-Royce Corporation, Indianapolis, IN (US); Rolls-Royce plc, London (GB)

(72) Inventors: Daniel K. Vetters, Indianapolis, IN (US); Michael J. Whittle, London (GB)

(73) Assignees: Rolls-Royce Corporation, Indianapolis, IN (US); Rolls-Royce plc

( * ) Notice: Subject to any disclaimer, the term of this patent is extended or adjusted under 35 U.S.C. 154(b) by 424 days.

(21) Appl. No.: 16/545,797

(22) Filed: Aug. 20, 2019

(65) Prior Publication Data

US 2021/0054745 A1    Feb. 25, 2021

(51) Int. Cl.
| | |
|---|---|
| *F01D 5/18* | (2006.01) |
| *F01D 5/28* | (2006.01) |
| *F01D 5/14* | (2006.01) |
| *F01D 11/00* | (2006.01) |
| *F01D 11/02* | (2006.01) |

(52) U.S. Cl.
CPC .............. *F01D 5/18* (2013.01); *F01D 5/147* (2013.01); *F01D 5/282* (2013.01); *F01D 5/284* (2013.01); *F01D 11/001* (2013.01); *F01D 11/025* (2013.01); *F05D 2220/323* (2013.01); *F05D 2240/12* (2013.01); *F05D 2240/301* (2013.01); *F05D 2240/55* (2013.01); *F05D 2300/6033* (2013.01)

(58) Field of Classification Search
CPC .......... F01D 5/18; F01D 5/147; F01D 11/001; F01D 11/025; F01D 5/284
See application file for complete search history.

(56) References Cited

U.S. PATENT DOCUMENTS

| | | | |
|---|---|---|---|
| 4,384,822 A | 5/1983 | Schweikl et al. | |
| 6,164,903 A | 12/2000 | Kouris | |
| 6,524,065 B2 | 2/2003 | Briesenick et al. | |
| 7,172,388 B2 | 2/2007 | Synnott | |
| 7,540,709 B1 | 6/2009 | Ebert | |
| 8,226,361 B2 | 7/2012 | Prentice et al. | |
| 9,255,487 B2 | 2/2016 | Mayer et al. | |
| 9,612,017 B2 | 4/2017 | Vetters | |
| 10,253,641 B2 | 4/2019 | Shapiro et al. | |
| 2017/0022833 A1* | 1/2017 | Heitman | F01D 9/041 |
| 2017/0254271 A1* | 9/2017 | Hillier | F01D 5/282 |
| 2019/0128132 A1 | 5/2019 | Tableau et al. | |

* cited by examiner

*Primary Examiner* — Michael L Sehn
(74) *Attorney, Agent, or Firm* — Barnes & Thornburg LLP

(57) ABSTRACT

An airfoil assembly for a gas turbine engine includes a vane, a support strut, and an inner carrier. The vane is adapted to interact with hot gases flowing around the airfoil assembly during use of the airfoil assembly. The support strut is located in an interior cavity formed in the vane and configured to receive force loads applied to the ceramic matrix composite vane by the hot gases. The inner carrier is coupled with the support strut and adapted to block the hot gases from flowing radially inward toward an axis of the gas turbine engine.

18 Claims, 7 Drawing Sheets

TURBINE VANE ASSEMBLY WITH CERAMIC MATRIX COMPOSITE PARTS AND PLATFORM SEALING FEATURES

FIELD OF THE DISCLOSURE

The present disclosure relates generally to gas turbine engines, and more specifically to ceramic matrix composite components incorporated into assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward airfoils included in stationary vanes and rotating blades of the turbine. The airfoils are often made from high-temperature resistant materials and/or are actively cooled by supplying relatively cool air to the vanes and blades due to the high temperatures of the combustion products. To this end, some airfoils for vanes and blades are incorporating composite materials adapted to withstand very high temperatures. Design and manufacture of vanes and blades from composite materials presents challenges because of the geometry and strength desired for the parts.

SUMMARY

The present disclosure may comprise one or more of the following features and combinations thereof.

An airfoil assembly for a gas turbine engine may include a ceramic matrix composite vane, a metallic support strut, and an inner carrier. The ceramic matrix composite vane may be adapted to interact with hot gases flowing around the airfoil assembly during use of the airfoil assembly. The metallic support strut may be located in the interior cavity formed in the airfoil and may be configured to receive force loads applied to the ceramic matrix composite vane by the hot gases during use of the airfoil assembly. The inner carrier may be coupled with the metallic support strut and may be adapted to block the hot gases from flowing radially inward toward the axis.

In some embodiments, the ceramic matrix composite vane may include an outer platform, an inner platform, and an airfoil. The inner platform may be spaced apart radially from the outer platform relative to an axis. The airfoil may extend radially between and interconnect the outer platform and the inner platform.

In some embodiments, the inner platform may have a body and a first inner platform lip. The first inner platform lip may extend radially inward from the body.

In some embodiments, the airfoil may be formed to define an interior cavity. The interior cavity may extend radially through the airfoil.

In some embodiments, the inner carrier may include a metallic base mount and a first floating ceramic matrix composite seal. The metallic base mount may be fixed with the metallic support strut. The first floating ceramic matrix composite seal may be located between the metallic base mount and the inner platform to block the hot gases from flowing between the metallic base mount and the inner platform.

In some embodiments, the first floating ceramic matrix composite seal includes a band, an axially extending flange, and a first radially extending flange. The axially extending flange may extend away from the band and engage the metallic base mount. The first radially extending flange may extend away from the band and engage the first inner platform lip to limit movement of the first floating ceramic matrix composite seal relative to the metallic base mount and the inner platform while. The first radially extending flange may allow for relative thermal growth between the first floating ceramic matrix composite seal, the metallic base mount, and the inner platform.

In some embodiments, the metallic base mount may include a core, a first arm, and a second arm. The first arm may extend axially away from the core in a first direction. The second arm may extend axially away from the core in the first direction.

In some embodiments, the second arm may be spaced apart radially from the first arm to define a pocket. The pocket may extend axially into the metallic base mount. The axially extending flange of the first floating ceramic matrix composite seal may extend into the pocket.

In some embodiments, the first floating ceramic matrix composite seal may further include a second radially extending flange. The second radially extending flange may extend away from the band. In some embodiments, the second radially extending flange may be spaced apart axially from the first radially extending flange to locate at least a portion of the first inner platform lip between the first radially extending flange and the second radially extending flange.

In some embodiments, the first floating ceramic matrix composite seal may further include a wing. The wing may extend from an axial end of the band radially outward and axially away from the first radially extending flange.

In some embodiments, the inner platform may include a second inner platform lip. The second inner platform lip may extend radially inward from the inner platform and may be spaced apart axially from the first inner platform lip.

In some embodiments, the inner carrier further comprises a second floating ceramic matrix composite seal. The second floating ceramic matrix composite seal may engage the second inner platform lip and the metallic base mount.

In some embodiments, the second floating ceramic matrix composite seal includes a band, an axially extending flange, and a first radially extending flange. The axially extending flange may extend away from the band of the second floating ceramic matrix composite seal and engage the metallic base mount. The first radially extending flange may extend away from the band of the second floating ceramic matrix composite seal and engage the second inner platform lip.

In some embodiments, the metallic base mount may be formed to include a core, a first arm, and a second arm. The first arm may extend axially away from the core in a first direction. The second arm may extend axially away from the core in the first direction.

In some embodiments, the second arm may be spaced apart radially from the first arm to define a first pocket. The first pocket may extend axially into the metallic base mount. The axially extending flange of the second floating ceramic matrix composite seal may extend into the first pocket.

In some embodiments, the metallic base mount may include a third arm and a fourth arm. The third arm may extend axially away from the core in a second direction. The fourth arm may extend axially away from the core in the second direction.

In some embodiments, the fourth arm may be spaced apart radially from the third arm to define a second pocket. The second pocket may extend axially into the metallic base mount. The axially extending flange of the second floating ceramic matrix composite seal may extend into the second pocket.

In some embodiments, the second floating ceramic matrix composite seal further includes a second radially extending flange. The second radially extending flange may extend away from the band of the second floating ceramic matrix composite seal. In some embodiments, the second radially extending flange of the second floating ceramic matrix composite seal may be spaced apart axially from the first radially extending flange of the second floating ceramic matrix composite seal to locate at least a portion of the second inner platform lip there between.

According to another aspect of the disclosure, an airfoil assembly may include a vane, a support strut, and an inner carrier. The vane may include an outer platform, an inner platform spaced apart radially from the outer platform relative to an axis, and an airfoil that extends radially between the outer platform and the inner platform. The support strut may extend radially into the airfoil.

In some embodiments, the inner carrier may include a base mount, and a rigid floating seal. The base mount may be fixed with the support strut. The rigid floating seal may be located between the base mount and the inner platform.

In some embodiments, the inner platform may have a body and an inner platform lip. The inner platform lip may extend radially inward from the body.

In some embodiments, the floating seal may include a circumferentially extending band, a first flange, and a second flange. The first flange may extend axially from the band and engage the base mount. The second flange may extend radially from the band and engage the inner platform lip.

In some embodiments, the base mount includes a core, a first arm, and a second arm. The first arm may extend away from the core in a first direction. The second arm may extend away from the core in the first direction.

In some embodiments, the second arm may be spaced apart from the first arm to define a pocket. The pocket may extend into the base mount and the second flange of the floating seal may extend into the pocket.

In some embodiments, the floating seal may further include a third flange. The third flange may extend radially from the band. In some embodiments, the third flange may be spaced apart axially from the second flange to locate at least a portion of the inner platform lip between the second flange and the third flange.

In some embodiments, the inner carrier may further includes a first tubular seal. The first tubular seal may be located in the pocket between the first flange and the base mount.

In some embodiments, the inner carrier further includes a second tubular seal. The second tubular seal may be located between the inner platform lip and the first flange of the floating seal.

In some embodiments, the floating seal may be substantially L-shaped. In some embodiments, the floating seal may be substantially J-shaped.

In some embodiments, the second flange includes a circumferentially extending wall and a ridge. The ridge may extend axially away from the wall and engage the inner platform lip to space the wall apart from the inner platform lip.

In some embodiments, the floating seal may further include a wing. The wing may extend away from a terminal end of the band radially and axially.

In some embodiments, the floating seal may include an anti-rotation feature. The anti-rotation feature may engage with the base mount to block rotation of the floating seal about the axis.

In some embodiments, the floating seal may include a first end and a second end. The second end may be spaced apart circumferentially from the first end relative to the axis to define a gap therebetween. In some embodiments, the floating seal may extend circumferentially about the axis such that the first end overlaps the second end.

These and other features of the present disclosure will become more apparent from the following description of the illustrative embodiments.

DETAILED DESCRIPTION OF THE DRAWINGS

Figure 1:
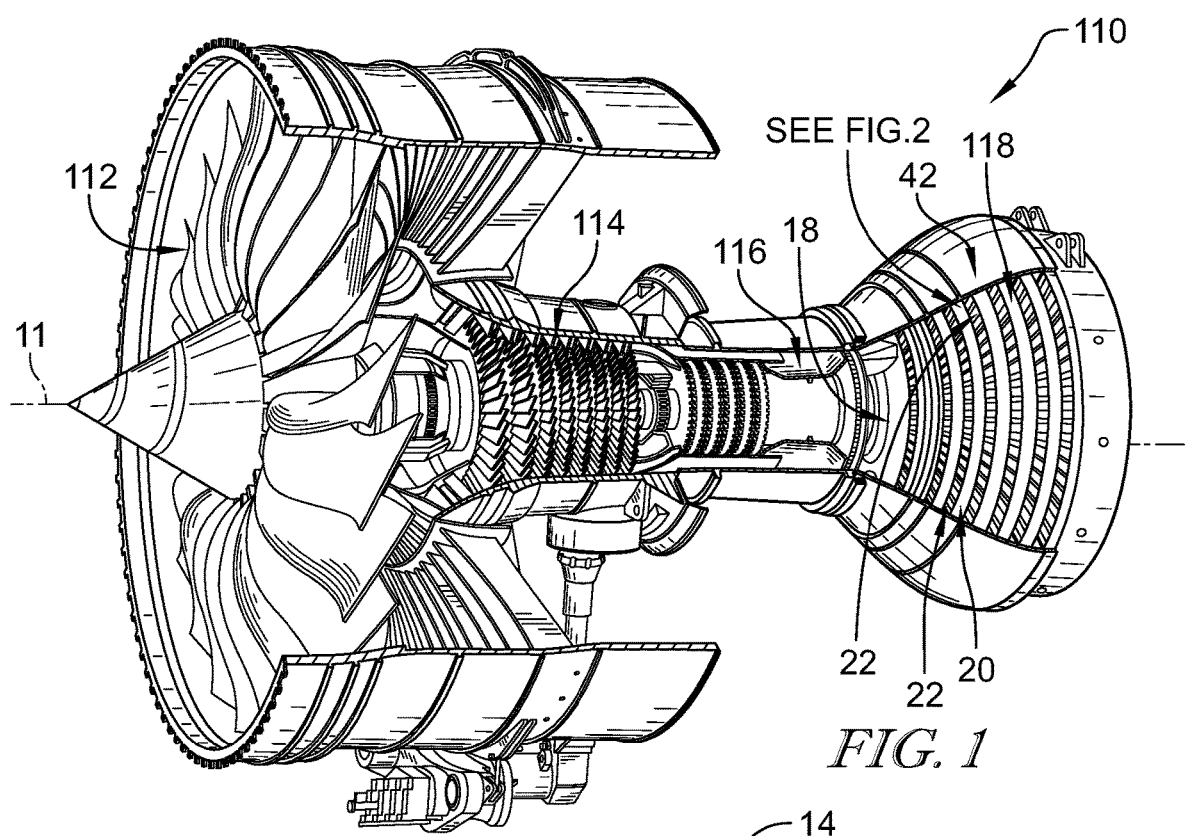
FIG. 1 is a cutaway view of a gas turbine engine that includes a fan, a compressor, a combustor, and a turbine, the turbine including rotating wheel assemblies and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

Figure 2:
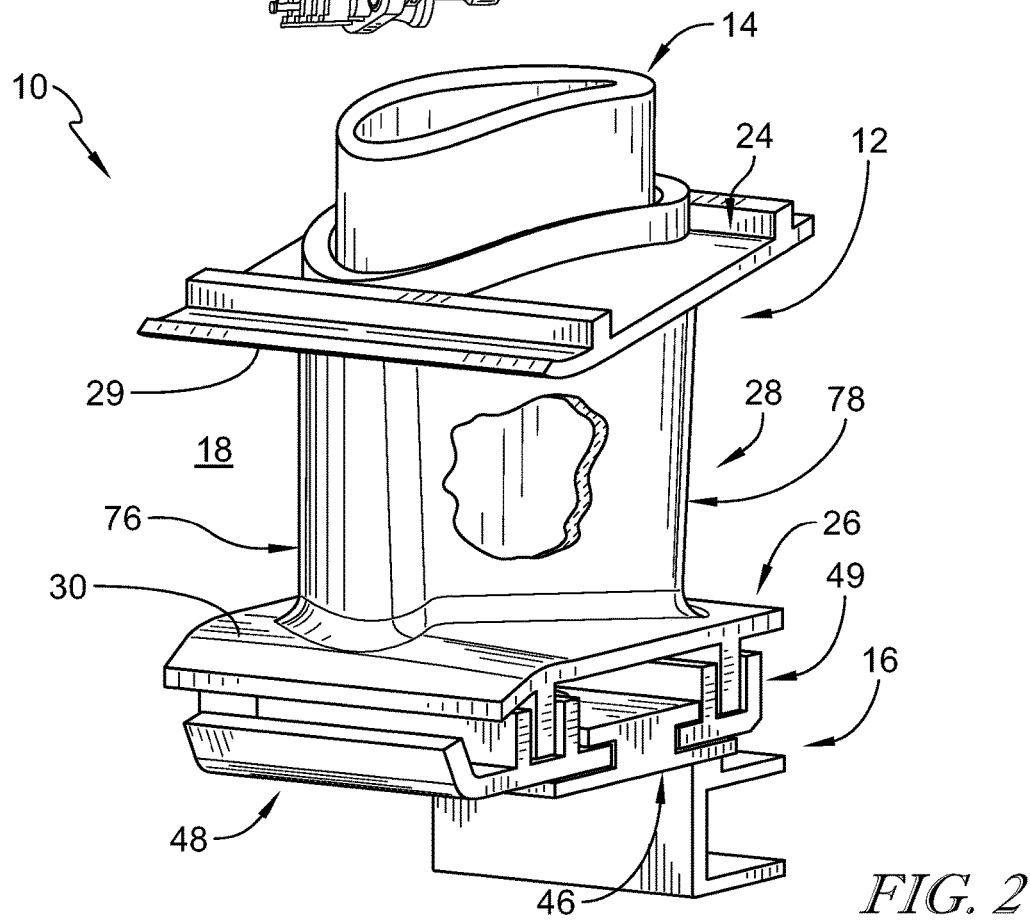
FIG. 2 is a perspective view of an airfoil assembly in accordance with the present disclosure of one of the static turbine vane rings of FIG. 1 showing that the airfoil assembly includes a vane adapted to interact with hot gases flowing through a gas path of the gas turbine engine, a support strut that extends radially through the vane to receive force loads from the vane, and an inner carrier coupled with the support strut and having floating seals to block the gases from flowing radially inward beyond the vane.

An airfoil assembly 10 for use in a gas turbine engine 110 is shown in FIG. 2. The illustrative airfoil assembly 10 includes a vane 12, a support strut 14, and an inner carrier 16 as shown in FIGS. 2-5. The vane 12 interacts with hot gases conducted through a gas path 18 of the gas turbine engine 110 and conducts the hot gases around the airfoil assembly 10 toward a rotating wheel assembly 22 located downstream of the airfoil assembly 10 as suggested in FIGS. 1 and 2. The support strut 14 extends through the vane 12 and receives force loads applied to the vane 12 by the hot gases. The inner carrier 16 is coupled with the support strut 14 for sealing the vane 12 and is adapted to block the hot gases from flowing radially inward toward an axis of the gas turbine engine 10.

The vane 12 comprises ceramic materials, while the support strut 14 comprises metallic materials in the illustrative embodiment. As such, the ceramic matrix composite vane 12 is adapted to withstand high temperatures, but may have relatively low strength compared to the metallic support strut 14. The support strut 14 provides structural strength to the airfoil assembly 10 by receiving the force loads applied to the vane 12 and transferring them to a casing 19 that surrounds the airfoil assembly 10. The support strut 14 may not be capable of withstanding directly the high temperatures experienced by the vane 12. Therefore, sealing between the vane 12 and the support strut 14 may be important in protecting the support strut 14 from the hot gases flowing through the gas turbine engine 110, as well as hot gas ingress into an interior cavity 37 of the vane 12. The inner carrier 16 may be made of metallic or ceramic matrix composite materials.

The inner carrier 16 may reduce the force loads applied to the relatively low strength ceramic matrix composite vane 12. The inner carrier 16 provides a seal between turbine chambers 42, 43 having different pressures as suggested in FIG. 4. The force loads caused by the pressure difference between the chambers 42, 43 is applied through the inner carrier 16 to the support strut 14 so that the pressure difference and, thus, the force loads, acting on the ceramic matrix composite vane 12 are reduced. As a result, the ceramic matrix composite vane 12 is exposed to the high temperature gases in the gas path 18 where it can withstand the hot temperatures while the inner carrier 16 is exposed to a relatively lower temperature environment and reduces the force loads applied to the relatively lower strength ceramic matrix composite vane 12.

The airfoil assembly 10 is adapted for use in the gas turbine engine 110, which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112. In other embodiments, the fan 112 may be omitted and the turbine 118 drives a propeller, drive shaft, or other suitable alternative.

The turbine 118 includes a plurality of static turbine vane rings 20 that are fixed relative to the axis 11 and a plurality of bladed rotating wheel assemblies 22 as suggested in FIG. 1. Each turbine vane ring 20 includes a plurality of turbine vane assemblies 10. The hot gases are conducted through the gas path 18 and interact with the bladed wheel assemblies 22 to cause the bladed wheel assemblies 22 to rotate about the axis 11. The turbine vane rings 20 are positioned to direct the gases toward the bladed wheel assemblies 22 with a desired orientation.

Figure 3:
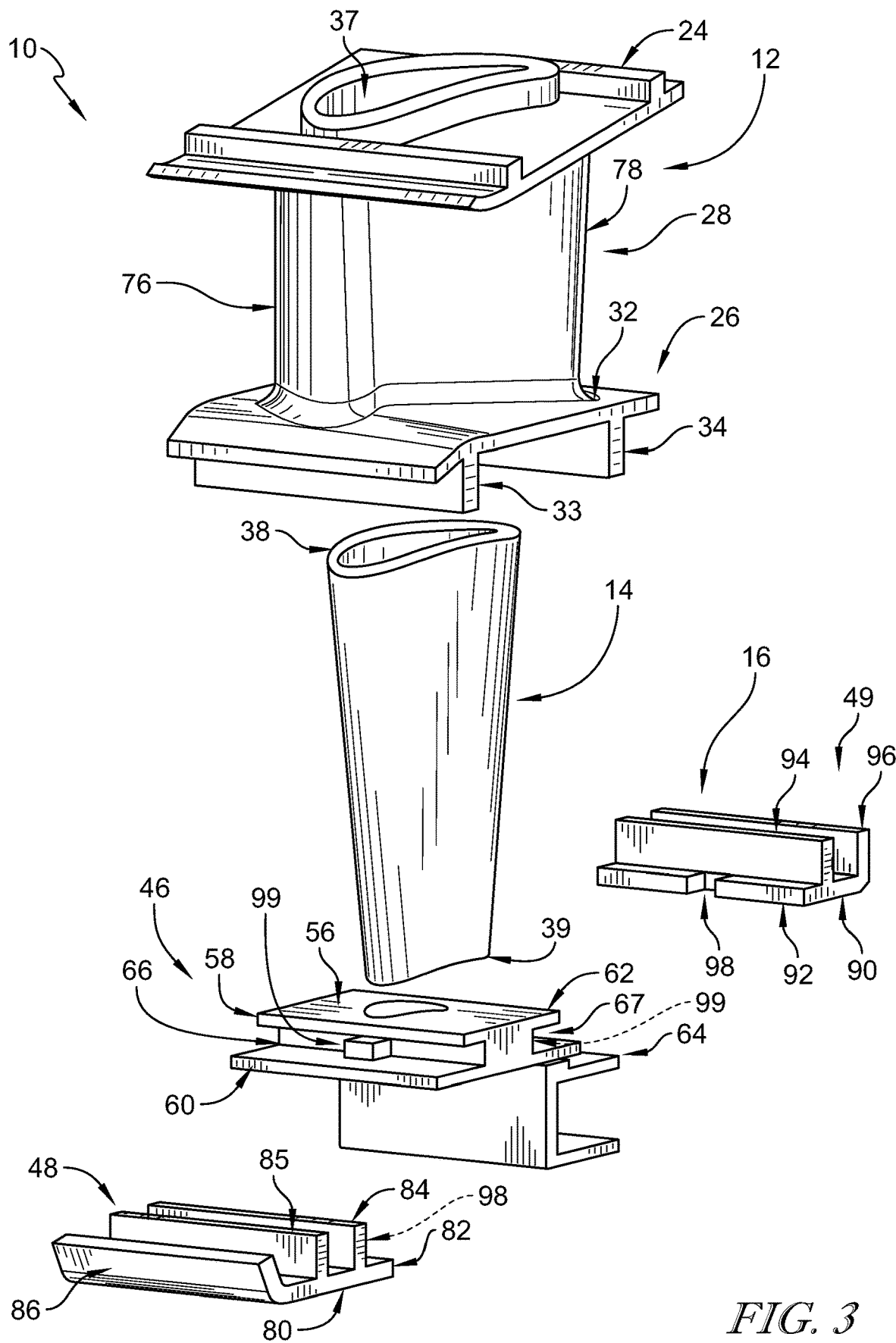
FIG. 3 is an exploded view of the airfoil assembly of FIG. 2 showing the vane includes an outer platform, an inner platform spaced radially from the outer platform, and an airfoil that extends between and interconnects the outer and inner platforms, and further showing the support strut and that the inner carrier of the airfoil assembly includes a base mount fixed to the support strut, a forward floating seal located on a forward side of the vane, and an aft floating seal located on an aft side of the vane that are assembled together to form the inner carrier.
Figure 4:
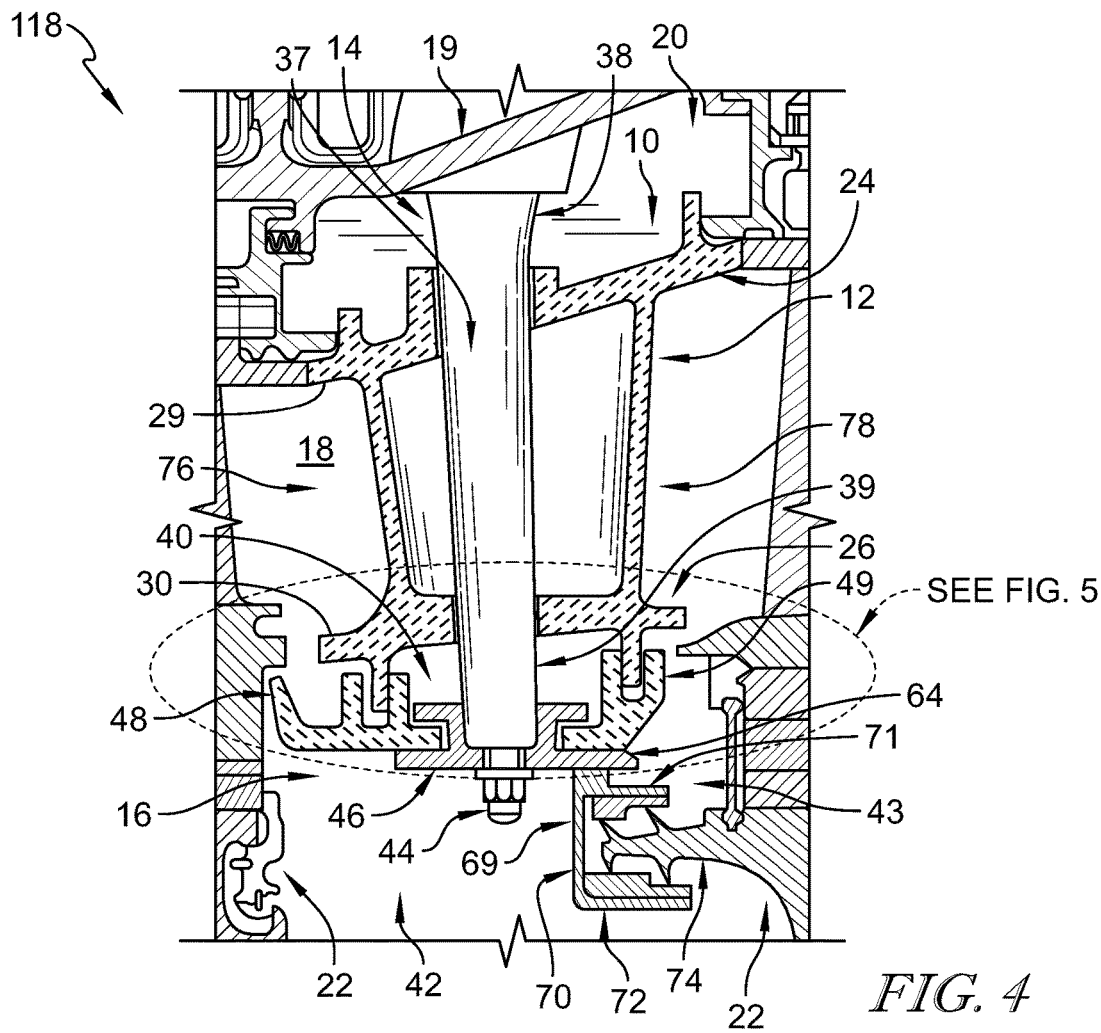
FIG. 4 is a section view of a portion of the turbine included in the gas turbine engine of FIG. 2 showing the airfoil assembly and portions of the turbine casing and rotating wheel assemblies.

The vane 12 of each airfoil assembly 10 includes an outer platform 24, an inner platform 26, and an airfoil 28 as shown in FIGS. 2-4. The outer platform 24 defines an outer boundary 29 of the gas path 18. The inner platform 26 is spaced apart radially from the outer platform 24 relative to the axis 11 to define an inner boundary 30 of the gas path 18. The airfoil 28 extends radially between and interconnects the outer platform 24 and the inner platform 26. The airfoil 28 is shaped to redirect gases flowing through the gas path 18 and to shield the support strut 14 from the hot gases in the gas path 18.

The inner platform 26 includes a body 32, a first inner platform lip 33, and a second inner platform lip 34 as shown in FIGS. 2-5. The body 32 extends axially to define the inner boundary 30 of the gas path 18. The first or forward inner platform lip 33 extends radially inward from the body 32. The second or aft inner platform lip 34 extends radially inward from the body 32 and is spaced apart axially from the forward inner platform lip 33.

The airfoil 28 is also formed to define the interior cavity 37 that extends radially into the airfoil 28 as shown in FIG. 3. Illustratively, the interior cavity 37 extends radially entirely through the outer platform 24, the inner platform 26, and the airfoil 28.

In the illustrative embodiment, the outer platform 24, the inner platform 26, and the airfoil, 28 of the vane 12 are integrally formed from ceramic matrix composite materials. As such, the outer platform 24, the inner platform 26, and the airfoil 28 provide a single, integral, one-piece vane 12 as shown in FIG. 3. In other embodiments, the outer platform 24, the inner platform 26, and the airfoil 28 may be formed as separate components and coupled together.

The support strut 14 is engaged directly or indirectly via load pads, seals, etc., with the vane 12 to receive force loads from the vane 12 and to transfer the force loads to the casing 19 as suggested in FIG. 4. The support strut 14 is located in the interior cavity 37 and extends radially through the outer platform 24, the inner platform 26, and the airfoil 28 as shown in FIG. 4.

The support strut 14 extends radially between a first end 38 and a second end 39 as shown in FIGS. 3 and 4. The first end 38 is located radially outward of the outer platform 24 and the second end 39 is located radially inward of the inner platform 26. The support strut 14 extends radially inward beyond the inner platform 26 to locate the inner platform 26 between the first end 38 and the second end 39 of the support strut 14. The support strut 14 extends radially outward beyond the outer platform 24. The first end 38 of the support strut 14 is coupled to the casing 19 arranged around the airfoil assembly 10.

The support strut 14 is cantilevered from the casing 19 in the illustrative embodiment, the second end 39 being free. In other embodiments, the support strut 14 may be coupled to an outer carrier, which may be supported, from the casing 19 or other surrounding components. The outer carrier may couple to the casing 19 through hangers or rails typically used in metallic vane embodiments.

The support strut 14 is hollow as shown in the illustrative embodiment of FIGS. 3 and 4. The hollow support strut 14 allows a flow cooling air to be transmitted into an inner chamber 40 formed between the inner platform 26 of the vane 12 and the inner carrier 16. The inner chamber 40 has a different pressure than the chambers 42, 43 as well as a different pressure than in the gas path 18. In some embodiments, the support strut 14 includes holes that extend through the support strut 14 to allow cooling air to pass through the hollow support strut 14 and flow into the interior cavity 37. In some embodiments, the hollow support strut 14 allows a flow of cooling air to be transmitted to the chambers 42, 43 to cool the components of the turbine wheel 22 before or after the vane 12 as desired. In other embodiments, the support strut 14 is solid material between the first end 38 to the second end 39.

In the illustrative embodiment, the support strut 14 is formed to receive a fastener 44. The fastener 44 is configured to couple the inner carrier 16 to the support strut 14.

The inner carrier 16 includes a base mount 46, a first floating seal 48, and a second floating seal 49 as shown in FIGS. 2-7. The base mount 46 is made of metallic materials and is fixed with the support strut 14. The first or forward floating seal 48 is located between the base mount 46 and the inner platform 26 on a forward side 76 of the vane 12 to block the hot gases from flowing between the base mount 46 and the inner platform 26. The second or aft floating seal 49 is located between the base mount 46 and the inner platform 26 on an aft side 78 of the vane 12 to block the hot gases from flowing between the base mount 46 and the inner platform 26.

In illustrative embodiments, the vane 12 and inner carrier 16 comprise ceramic materials while the support strut 14 comprises metallic materials. The forward and aft floating seals 48, 49 are made of ceramic matrix composites, while the base mount 46 is made of metallic materials in the illustrative embodiment. In other embodiments, the forward and aft floating seals 48, 49 may be made of metallic materials. In other embodiments, each of the vane 12, support strut 14, and inner carrier 16 may comprise any suitable materials including ceramics, ceramic matrix composites, metals, alloys, super alloys, etc.

Figure 12:
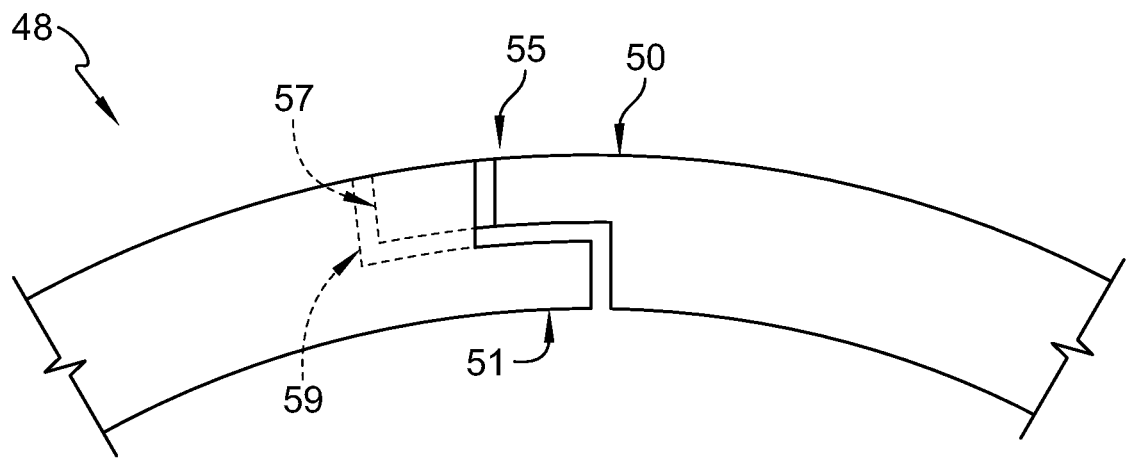
FIG. 12 is an axial view of a portion of the airfoil assembly of FIG. 3 showing the floating seal is a split hoop that includes an axial overlap that allows the hoop to expand and contract in response to thermal expansion or contraction of the mating components due to changes in temperature during use of the gas turbine engine.
Figure 13:
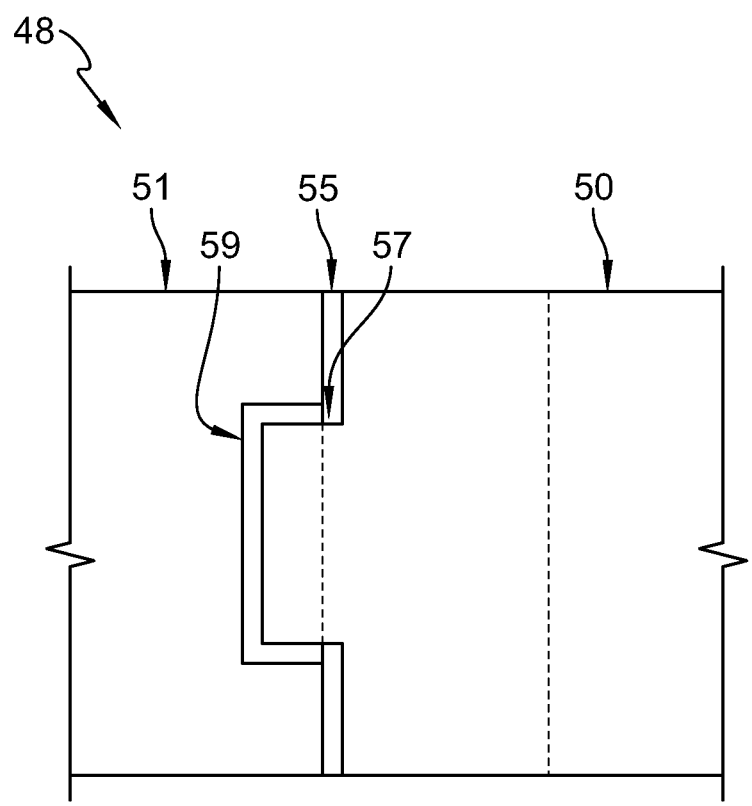
FIG. 13 is a radial top view of the portion of the airfoil assembly of FIG. 12 showing the floating seal is a split hoop that also includes a circumferential overlap that axially aligns end of the float seal and blocks axial movement of the end of the floating seal relative to one another, while also restricting flow through the resulting gap in the split hoop.

The forward and aft seals 48, 49 are continuous hoops and include a first end 50 and a second end 51 as shown in FIGS. 12 and 13. The second end 51 is spaced apart circumferentially from the first end 50 to define a gap or an overlap split 55 therebetween. The overlap split 55 in the seal 48 is configured to allow for expansion and contraction of the seal 48 relative to the axis 11 in response to thermal expansion or contraction of the mating components 12, 46, which may result in better overall sealing of the airfoil assembly 10.

In the illustrative embodiment, the floating seal 48 extends circumferentially about the axis 11 such that the first end 50 overlaps the second end 51. In other embodiments, the seals 48, 49 may be segmented such that the first end 50 of the seal 48, 49 mates with the second end 51 of the adjacent seal 48, 49 to allow for expansion and contraction of the segments. In other embodiments, the floating seals 48, 50 may be continuous hoops without a gap or overlap split 55.

The first end 50 is shaped to include a circumferentially-extending tab 57 and the second end 51 is shaped to include a tab notch 59 as shown in FIG. 13. The circumferentially-extending tab 57 of the first end 50 extends into the tab notch 59 formed in the second end 51 to axially align the first and second ends 50, 51 of the floating seal 48, while also restricting the flow of gases through the gap 55. The torturous path through the overlap split created by the overlapping edges 50, 51 of the seal 48 helps restrict the flow of gases through the gap 55, reducing parasitic flow. The circumferentially-extending tab 57 of the first end 50 in the tab notch 59 blocks axial movement of the ends 50, 51 while allowing the floating seal 48 to expand and contract.

In the illustrative embodiment, the overlap split 55 is in an axial direction and a radial direction. In other embodiments, the overlap split may be in one of the axial direction and radial direction only. In some embodiments, the overlap split 55 may be a combination of both radial and axial components (i.e. radial overlap on the radially extending flange and axial overlap on the axially extending flange).

The base mount 46 includes a core 56, a first arm 58, a second arm 60, a third arm 62, and a fourth arm 64 as shown in FIGS. 2-5. The core 56 is coupled to the support strut 14. The first and second arms 58, 60 extend axially away from the core 56 in a first direction, while the third and fourth arms 62, 64 extend axially away from the core 56 in a second direction. The second arm 60 is spaced apart radially from the first arm 58 to define a first pocket 66 that extends axially into the base mount 46. The fourth arm 64 is spaced apart radially from the third arm 60 to define a second pocket 67 that extends axially into the base mount 46.

Figure 5:
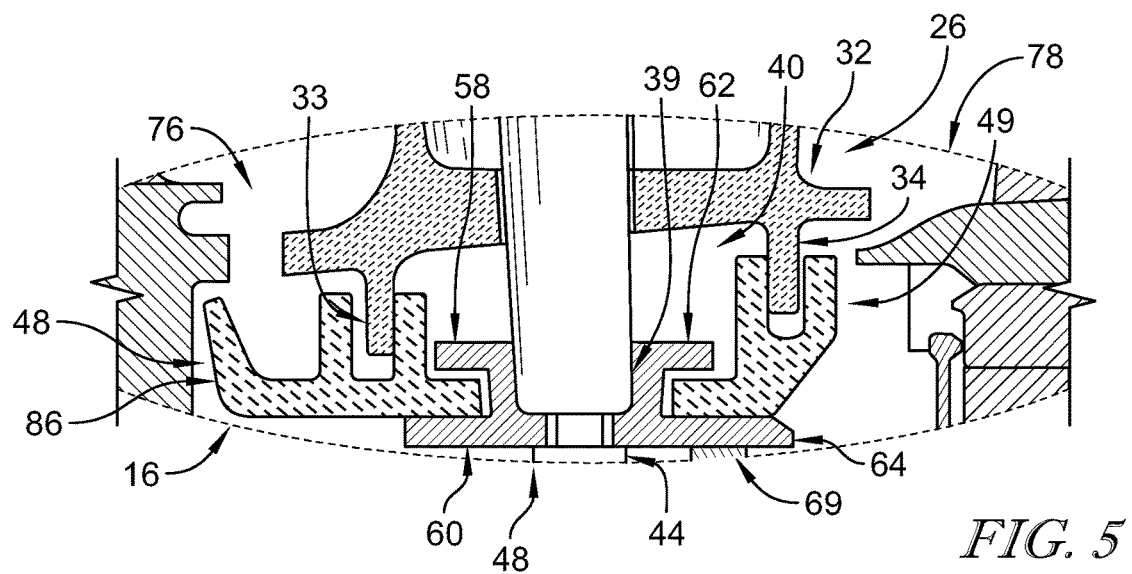
FIG. 5 is an enlarged view of FIG. 4 showing the inner platform of the vane includes a base panel that extends axially to define the inner boundary, a forward inner platform lip that extends radially from the base panel, and an aft inner platform lip that extends radially from the base panel, and further showing the forward and aft floating seals engage the forward and aft inner platform lips to block hot gases from moving radially inward.

In the illustrative embodiment, the base mount 46 further includes an intersegment seal 69 as shown in FIGS. 4 and 5. The intersegment seal 69 is a separate component that is cross-keyed to the core 56 of the base mount 46. The intersegment seal 69 extends around the axis 11 to form a full hoop in the illustrative embodiment.

The intersegment seal 69 is shaped to include a radially extending portion 70 and seal lands 71, 72 as shown in FIG. 4. The radially extending portion 70 is coupled to the core 56 and extends radially inward. The seal lands 71, 72 extend axially aft from the radially extending portion 70 and are radially spaced apart from each other to receive a rotor 74 of the downstream turbine wheel assembly 22. The seal lands 71, 72 engage the rotor 74 to seal between the turbine wheel assemblies 22 resulting in a first pressure on the forward side 76 of the vane 12 in the forward chamber 42 and a second pressure on the forward side 78 of the vane 12 in the aft chamber 43.

Figure 6:
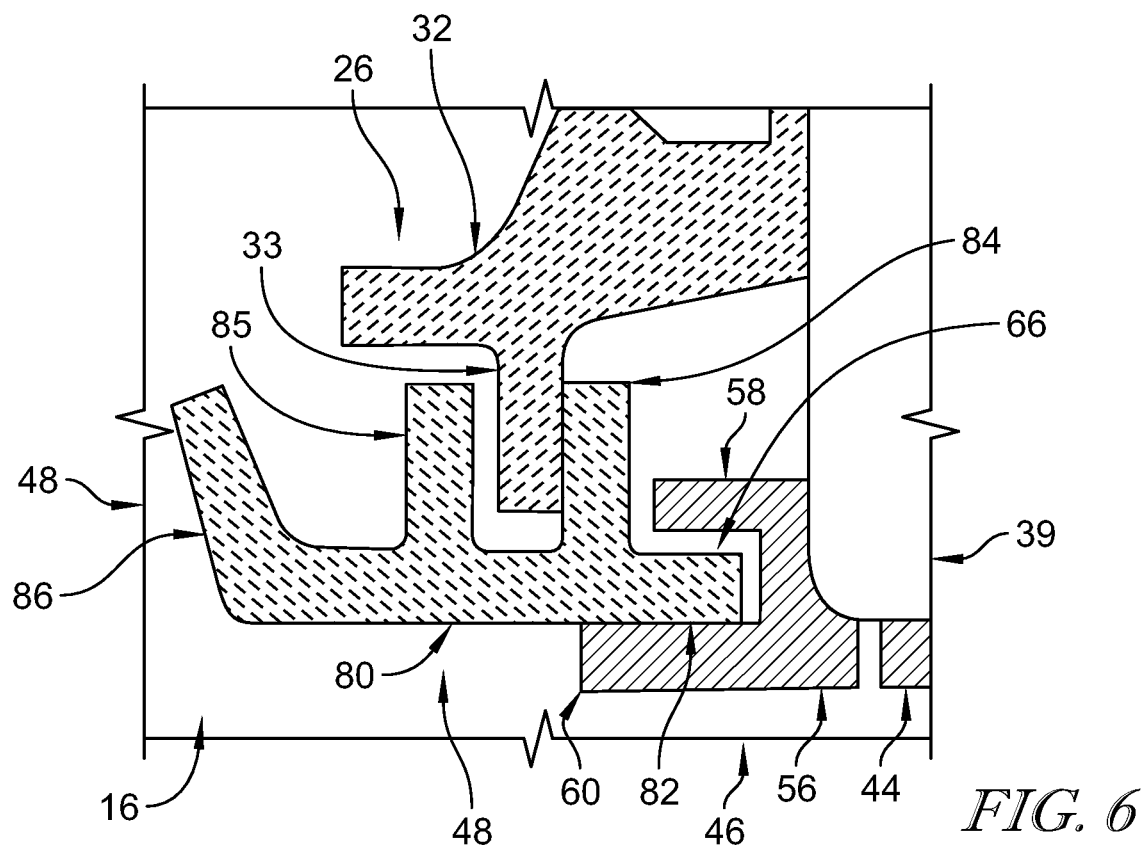
FIG. 6 is a detail view of the airfoil assembly of FIG. 5 showing the forward floating seal includes a band, an axially extending flange that extends into a forward pocket formed in the base mount, and first and second radially extending flanges that each extend radially from the band and engage the forward inner platform lip to seal the forward side of the vane.

The forward floating seal 48 includes a band 80, an axially extending flange 82, a first radially extending flange 84, a second radially extending flange 85, and a wing 86 as shown in FIGS. 5 and 6. The axially extending flange 82 extends away from the band 80 of the forward floating seal 48 in the first pocket 66 and engages the base mount 46 to limit radial movement of the forward floating seal 48 relative to the base mount 46. The first radially extending flange 84 and the second radially extending flange 85 each extend away from the band 80 and engage the forward inner platform lip 33. The radially extending flanges 84, 85 engage the forward inner platform lip 33 to limit axial movement of the forward floating seal 48 relative to the base mount 46 and the inner platform 26, while allowing for relative thermal growth between the first floating seal 48, the base mount 46, and the inner platform 26. The wing 86 extends from an axial end of the band 80 radially outward and axially away from the radially extending flanges 84, 85 and is configured to discourage flow between the airfoil assembly 10 and the adjacent turbine wheel 22.

Figure 7:
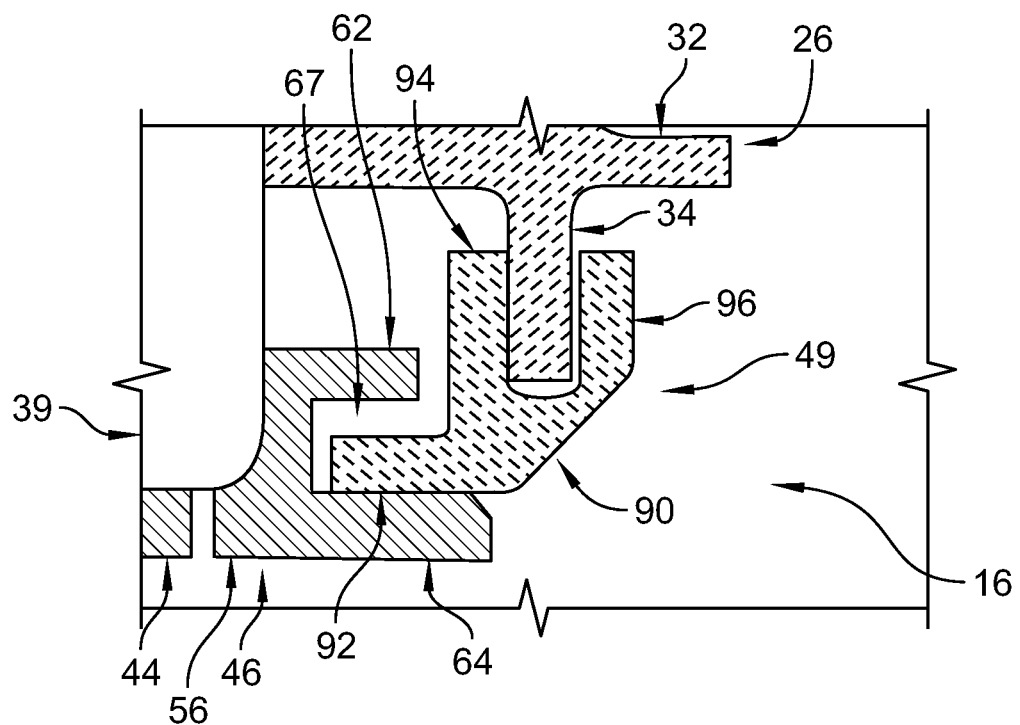
FIG. 7 is a detail view of the airfoil assembly of FIG. 5 showing the aft floating seal includes a band, an axially extending flange that extends into an aft pocket formed in the base mount, and first and second radially extending flanges that each extend radially from the band and engage the aft inner platform lip to seal the aft side of the vane.

The aft floating seal 49 includes a band 90, an axially extending flange 92, a first radially extending flange 94, and a second radially extending flange 96 as shown in FIGS. 5 and 7. The axially extending flange 92 extends away from the band 90 of the aft floating seal 49 into the second pocket 67 and engages the base mount 46 to limit radial movement of the aft floating seal 49 relative to the base mount 46. The first radially extending flange 94 and the second radially extending flange 96 each extend away from the band 90 and engage the aft inner platform lip 34 to limit axial movement of the aft floating seal 49 relative to the base mount 46 and the inner platform 26, while allowing for relative thermal growth between the second floating seal 49, the base mount 46, and the inner platform 26.

In the illustrative embodiments, the forward and aft floating seals 48, 49 are both shaped to include an anti-rotation feature 98 that engages with the base mount 46 as shown in FIG. 3. The seal 48, 49 includes an anti-rotation notch 98 that mates with an anti-rotation lug 99 formed in the base mount 46. The anti-rotation lug 99 extends into the notch 98 to block circumferential movement of the seal 48, 49 relative to the axis 11. In other embodiments, the anti-rotation features may be reversed such that the seal 48, 49 includes the anti-rotation lug 99 that mates with the notch 98 formed in the base mount 46. In other embodiments, the seals 48, 49 and base mount 46 may both be shaped to include an anti-rotation notch 98 and that receive an anti-rotation pin to block circumferential movement.

In the illustrative embodiment, the axially extending flange 82, 92 is shaped to include the anti-rotation notch 98. The anti-rotation lug 99 is located in the pocket 66, 67 and extends into the notch 98 to block circumferential movement of the seal 48, 49. In other embodiments, the anti-rotation feature 98 may be formed in another portion of the seal 48, 49.

In some embodiments, if the floating seals 48, 50 are segmented, then each floating seal 48, 50 may include an anti-rotation feature 98. In other embodiments, if the floating seals 48, 50 are hoops that extend around the axis 11, then the floating seals 48, 50 may include a single anti-rotation feature 98. In other embodiments, more than one anti-rotation feature 98 may be included on the full hoop floating seals 48, 50.

Figure 8:
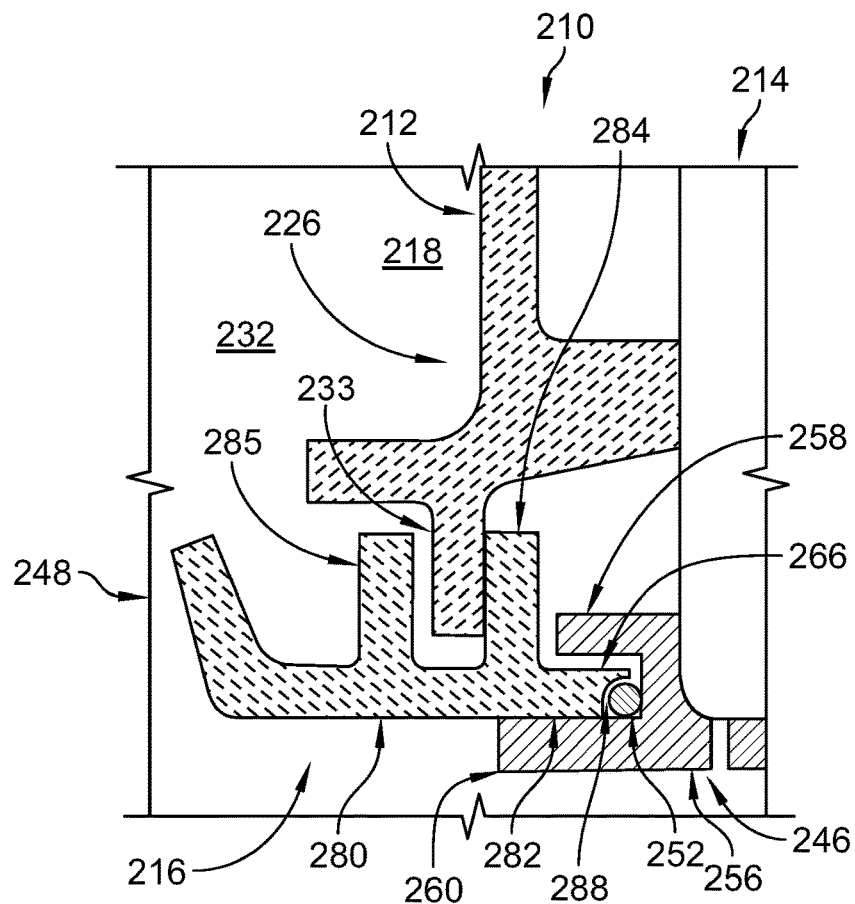
FIG. 8 is a detail view of another embodiment of an airfoil assembly showing the airfoil assembly includes a vane that defines a portion of a gas path of the engine, a support strut that extends axially through the vane, and an inner carrier that includes a base mount fixed to the support strut, a floating seal located between an inner platform of a vane and the base mount, and a tubular seal located in a pocket between the floating seal and the base mount to provide additional sealing at the inner carrier.

Another embodiment of an airfoil assembly 210 in accordance with the present disclosure is shown in FIG. 8. The airfoil assembly 210 is substantially similar to the airfoil assembly 10 shown in FIGS. 1-7 and described herein. Accordingly, similar reference numbers in the 200 series indicate features that are common between the airfoil assembly 10 and the airfoil assembly 210. The description of the airfoil assembly 10 is incorporated by reference to apply to the airfoil assembly 210, except in instances when it conflicts with the specific description and the drawings of the airfoil assembly 210.

The turbine vane assembly 210 includes a ceramic matrix composite vane 212, a metallic support strut 214, and an inner carrier 216 as shown in FIG. 8. The ceramic matrix composite vane 212 interacts with hot gases conducted through a gas path 218 of the gas turbine engine 110. The metallic support strut 214 extends through the ceramic matrix composite vane 212 and receives force loads applied to the ceramic matrix composite vane 212 by the hot gases. The inner carrier 216 is coupled with the support strut 214 and adapted to block the hot gases from flowing radially inward toward an axis of the gas turbine engine 210.

The inner carrier 216 includes a base mount 246, a floating seal 248, and a tubular seal 252 as shown in FIG. 8. The base mount 246 is made of metallic materials and is fixed with the support strut 214. The floating seal 248 is located between the base mount 246 and an inner platform 226 of the vane 212 to block the hot gases from flowing between the base mount 246 and the inner platform 226. The tubular seal 252 is arranged between the base mount 246 and the floating seal 248 to seal between the components and block hot gases from flowing radially inward.

The base mount 246 includes a core 256, a first arm 258, and a second arm 260 as shown in FIG. 8. The core 256 is coupled to the support strut 214. The first and second arms 258, 260 extend axially away from the core 256 in a first direction. The second arm 260 is spaced apart radially from the first arm 258 to define a pocket 266 that extends axially into the base mount 246. In the illustrative embodiment, the tubular seal 252 is located in the pocket 266 between the floating seal 248 and the base mount 246.

The forward floating seal 248 includes a band 280, an axially extending flange 282, a first radially extending flange 284, and a second radially extending flange 285 as shown in FIG. 8. The axially extending flange 282 extends away from the band 280 of the floating seal 248 in the pocket 266 and engages the base mount 246. The first radially extending flange 284 and the second radially extending flange 285 each extend away from the band 280 and engage an inner platform lip 233 extending from the inner platform 226 of the vane 212. The radially extending flanges 284, 285 engage the inner platform lip 233 to limit movement of the floating seal 248 relative to the base mount 246 and the inner platform 226, while allowing for relative thermal growth between the floating seal 248, the base mount 246, and the inner platform 226.

The axially extending flange 282 is shaped to include a tubular seal channel 288 as shown in FIG. 8. The tubular seal channel 288 opens axially inwards toward the pocket 266 and receives the tubular seal 252.

In other embodiments, the mating arrangement between the floating seals 248 and the base mount 246 may be reversed. The floating seal 248 may include two axially extending flanges 282 that form the pocket 266, while the base mount 246 may include only one axially extending arm 258 that extends into the pocket 266 formed in the seal 248.

In the illustrative embodiment, the pressure in the inner chamber 40 is greater than the pressure in the chambers 42 so as to push the tubular seal 252 into the gap between the mating components. The pressure difference pushes the tubular seal 252 into engagement with the surface of the pocket 266 and the surface of the tubular seal channel 288 to seal the interface between the seal 248 and the base mount 246. In the illustrative embodiment, the seal 252 is a full hoop seal 252. In other embodiments, the seal 252 may be a split hoop.

Figure 9:
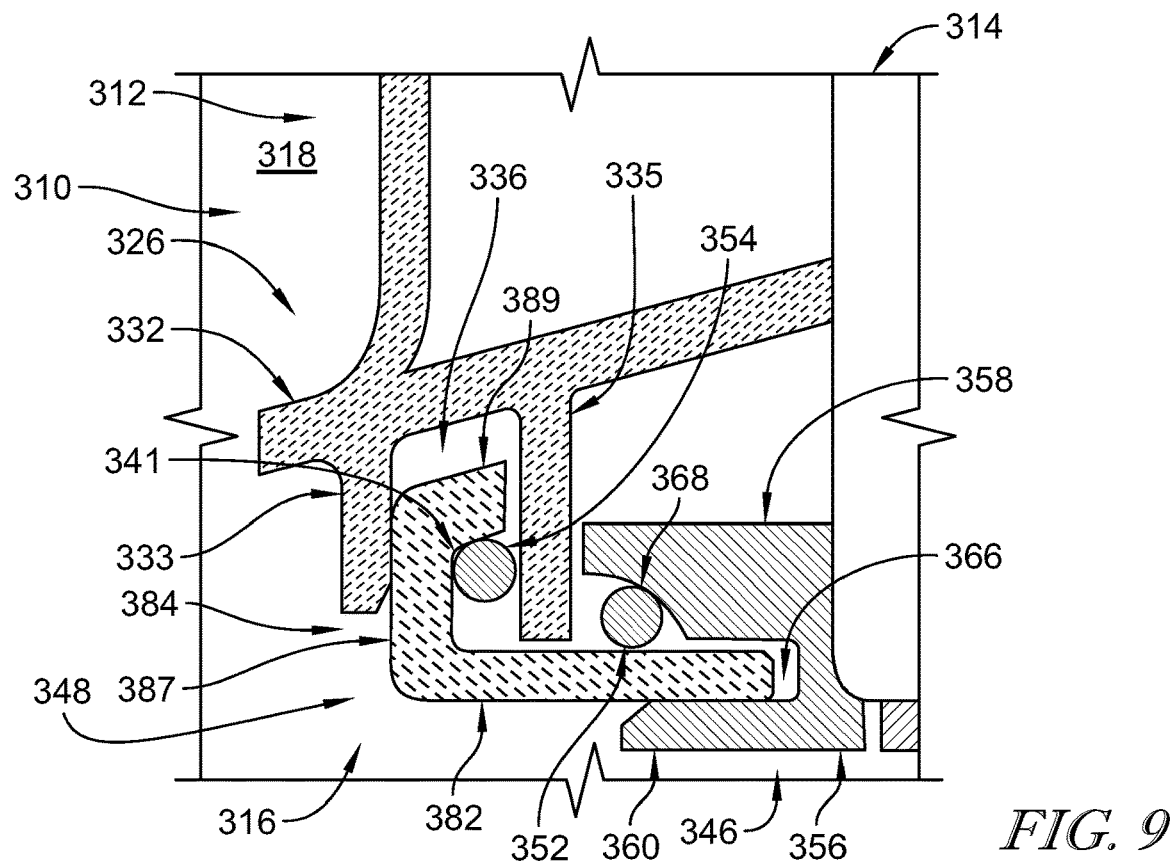
FIG. 9 is a detail view of another embodiment of an airfoil showing the airfoil assembly includes a vane that defines a portion of a gas path of the engine, a support strut that extends axially through the vane, and an inner carrier that includes a base mount fixed to the support strut, a floating seal located between an inner platform of a vane and the base mount, a first tubular seal located in a pocket between the floating seal and the base mount, and a second tubular seal locating between the floating seal and a portion of the inner platform.

Another embodiment of an airfoil assembly 310 in accordance with the present disclosure is shown in FIG. 9. The airfoil assembly 310 is substantially similar to the airfoil assembly 10 shown in FIGS. 1-7 and described herein. Accordingly, similar reference numbers in the 300 series indicate features that are common between the airfoil assembly 10 and the airfoil assembly 310. The description of the airfoil assembly 10 is incorporated by reference to apply to the airfoil assembly 310, except in instances when it conflicts with the specific description and the drawings of the airfoil assembly 310.

The turbine vane assembly 310 includes a ceramic matrix composite vane 312, a metallic support strut 314, and an inner carrier 316 as shown in FIG. 9. The ceramic matrix composite vane 312 interacts with hot gases conducted through a gas path 318 of the gas turbine engine 110. The metallic support strut 314 extends through the ceramic matrix composite vane 312 and receives force loads applied to the ceramic matrix composite vane 312 by the hot gases. The inner carrier 316 is coupled with the support strut 314 and adapted to block the hot gases from flowing radially inward toward an axis of the gas turbine engine 310.

The vane 312 includes an inner platform 326 that defines an inner boundary of the gas path 318 as shown in FIG. 9. The inner platform 326 is shaped to include a body 332, a first inner platform lip 333, and a second inner platform lip 335. Each of the inner platform lips 333 extend radially inward from the body 332. The second platform lip 335 is axially spaced apart from the first platform lip 333 to define a pocket 336 therebetween. The pocket 336 receives a portion of the inner carrier 316.

The inner carrier 316 includes a base mount 346, a floating seal 348, a first tubular seal 352, and a second tubular seal 354 as shown in FIG. 9. The base mount 346 is made of metallic materials and is fixed with the support strut 314. The floating seal 348 is located between the base mount 346 and the inner platform 326 of the vane 312 to block the hot gases from flowing between the base mount 346 and the inner platform 326. The first tubular seal 352 is arranged between the base mount 346 and the floating seal 348 to seal between the components and block hot gases from flowing radially inward. The second tubular seal 354 is arranged between the floating seal 348 and the platform lips 333, 335.

The base mount 346 includes a core 356, a first arm 358, and a second arm 360 as shown in FIG. 9. The core 356 is coupled to the support strut 314. The first and second arms 358, 360 extend axially away from the core 356 in a first direction. The second arm 360 is spaced apart radially from the first arm 358 to define a pocket 366 that extends axially into the base mount 346. In the illustrative embodiment, the tubular seal 352 is located in the pocket 366 between the floating seal 348 and the base mount 346.

The first arm 358 is shaped to include a tubular seal channel 368 as shown in FIG. 9. The tubular seal channel 368 is configured to receive the first tubular seal 352 and provide a sealing surface that for the tubular seal 352 to engage, sealing the gap between the base mount 346 and the floating seal 348.

The forward floating seal 348 includes an axially extending flange 382 and a first radially extending flange 384 as shown in FIG. 9. The axially extending flange 382 extends into the pocket 366 and engages the base mount 346. The first radially extending flange 384 extends radially from the axially extending flange 382 and engages the inner platform lip 333 to limit movement of the floating seal 348 relative to the base mount 346 and the inner platform 326.

The radially extending flange 384 includes a circumferentially extending wall 387 and a ridge 389 as shown in FIG. 9. The ridge 389 extends axially away from the wall 387 such that the floating seal 348 is substantially J-shaped. The ridge 389 engages the inner platform lip 335 to space the wall 387 apart from the inner platform lip 335.

In the illustrative embodiment, the wall 387 and the ridge 389 form a seal notch 341 in the floating seal 348 as shown in FIG. 9. The tubular seal 354 is arranged in the seal notch 341 between the wall 387, the ridge 389, and the inner platform lip 333 to seal between the floating seal 348 and the inner platform 326.

Figure 10:
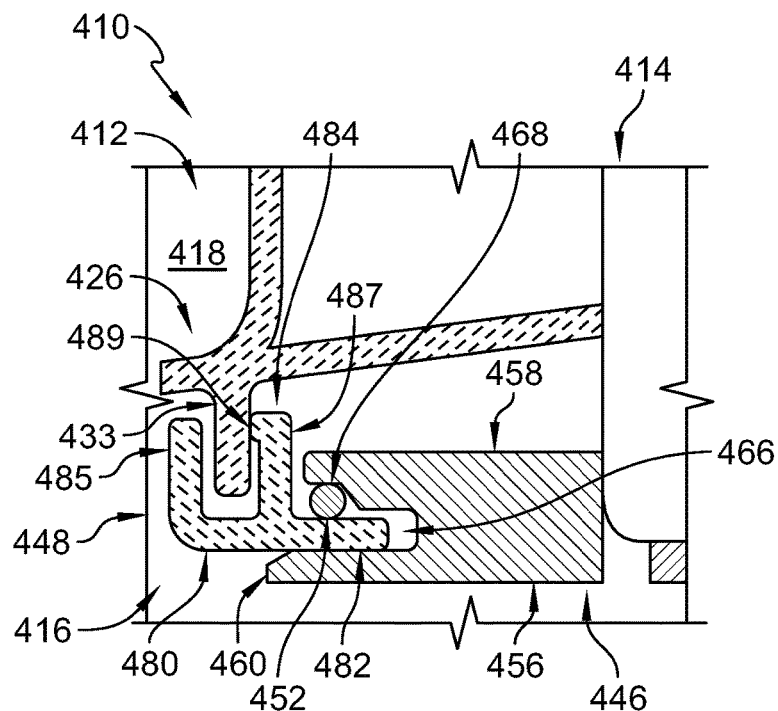
FIG. 10 is a detail view of another embodiment of an airfoil assembly showing the airfoil assembly includes a vane that defines a portion of a gas path of the engine, a support strut that extends axially through the vane, and an inner carrier that includes a base mount fixed to the support strut, a floating seal located between an inner platform of the vane and the base mount, and a tubular seal located in a pocket between the floating seal and the base mount to provide additional sealing at the inner carrier, and further showing the floating seal includes a ridge that engages the inner platform of the vane to axially space the floating seal from the inner platform.

Another embodiment of an airfoil assembly 410 in accordance with the present disclosure is shown in FIG. 10. The airfoil assembly 410 is substantially similar to the airfoil assembly 10 shown in FIGS. 1-7 and described herein. Accordingly, similar reference numbers in the 400 series indicate features that are common between the airfoil assembly 10 and the airfoil assembly 410. The description of the airfoil assembly 10 is incorporated by reference to apply to the airfoil assembly 410, except in instances when it conflicts with the specific description and the drawings of the airfoil assembly 410.

The turbine vane assembly 410 includes a ceramic matrix composite vane 412, a metallic support strut 414, and an inner carrier 416 as shown in FIG. 10. The ceramic matrix composite vane 412 interacts with hot gases conducted through a gas path 418 of the gas turbine engine 110. The metallic support strut 414 extends through the ceramic matrix composite vane 412 and receives force loads applied to the ceramic matrix composite vane 412 by the hot gases. The inner carrier 416 is coupled with the support strut 414 and adapted to block the hot gases from flowing radially inward toward an axis of the gas turbine engine 410.

The inner carrier 416 includes a base mount 446, a floating seal 448, and a tubular seal 452 as shown in FIG. 10. The base mount 446 is made of metallic materials and is fixed with the support strut 414. The floating seal 448 is located between the base mount 446 and an inner platform 426 of the vane 412 to block the hot gases from flowing between the base mount 446 and the inner platform 426. The tubular seal 452 is arranged between the base mount 446 and the floating seal 448 to seal between the components and block hot gases from flowing radially inward.

The base mount 446 includes a core 456, a first arm 458, and a second arm 460 as shown in FIG. 10. The core 456 is coupled to the support strut 414. The first and second arms 458, 460 extend axially away from the core 456 in a first direction. The second arm 460 is spaced apart radially from the first arm 458 to define a pocket 466 that extends axially into the base mount 446. In the illustrative embodiment, the tubular seal 452 is located in the pocket 466 between the floating seal 448 and the base mount 446.

The first arm 458 is shaped to include a tubular seal notch 468 as shown in FIG. 10. The tubular seal notch 368 is configured to receive the first tubular seal 452 and hold the seal 452 in place relative to the floating seal 448.

The forward floating seal 448 includes a band 480, an axially extending flange 482, a first radially extending flange 484, and a second radially extending flange 485 as shown in FIG. 10. The axially extending flange 482 extends away from the band 480 of the floating seal 448 in the pocket 466 and engages the base mount 446. The first radially extending flange 484 and the second radially extending flange 482 each extend away from the band 480 and engage an inner platform lip 433 extending from the inner platform 426 of the vane 412. The radially extending flanges 484, 485 engage the inner platform lip 433 to limit movement of the floating seal 448 relative to the base mount 446 and the inner platform 426, while allowing for relative thermal growth between the floating seal 448, the base mount 446, and the inner platform 426.

The radially extending flange 484 includes a circumferentially extending wall 487 and a ridge 489 as shown in FIG. 10. The ridge 489 extends axially away from the wall 487 and engages the inner platform lip 433 to space the wall 487 apart from the inner platform lip 433.

Figure 11:
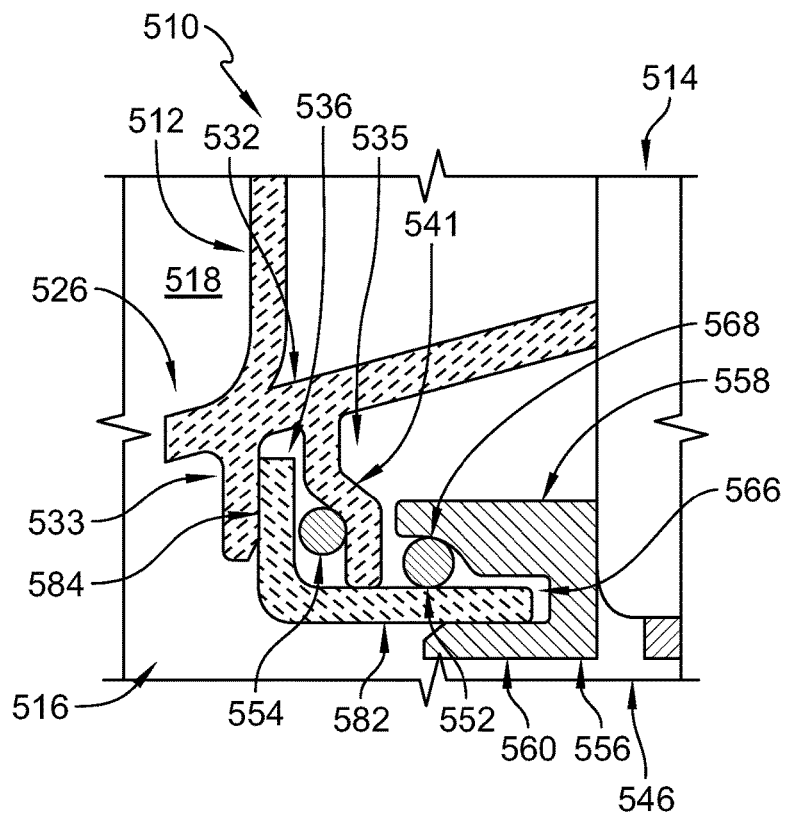
FIG. 11 is a detail view of another embodiment of an airfoil assembly showing the airfoil assembly includes a vane that defines a portion of a gas path of the engine, a support strut that extends axially through the vane, and an inner carrier that includes a base mount fixed to the support strut, a floating seal located between an inner platform of a vane and the base mount, a first tubular seal located in a pocket between the floating seal and the base mount, and a second tubular seal locating between the floating seal and a portion of the inner platform, and further showing the inner platform is shaped to include a seal notch that locates the second tubular seal relative to the floating seal.

Another embodiment of an airfoil assembly 510 in accordance with the present disclosure is shown in FIG. 11. The airfoil assembly 510 is substantially similar to the airfoil assembly 10 shown in FIGS. 1-7 and described herein. Accordingly, similar reference numbers in the 490 series indicate features that are common between the airfoil assembly 10 and the airfoil assembly 510. The description of the airfoil assembly 10 is incorporated by reference to apply to the airfoil assembly 510, except in instances when it conflicts with the specific description and the drawings of the airfoil assembly 510.

The turbine vane assembly 510 includes a ceramic matrix composite vane 512, a metallic support strut 514, and an inner carrier 516 as shown in FIG. 11. The ceramic matrix composite vane 512 interacts with hot gases conducted through a gas path 518 of the gas turbine engine 110. The metallic support strut 514 extends through the ceramic matrix composite vane 512 and receives force loads applied to the ceramic matrix composite vane 512 by the hot gases. The inner carrier 516 is coupled with the support strut 514 and adapted to block the hot gases from flowing radially inward toward an axis of the gas turbine engine 510.

The vane 512 includes an inner platform 226 that defines an inner boundary of the gas path 518 as shown in FIG. 11. The inner platform 226 is shaped to include a body 532, a first inner platform lip 533, and a second inner platform lip 535. Each of the inner platform lips 533 extend radially inward from the body 532. The second platform lip 535 is axially spaced apart from the first platform lip 533 to define a pocket 536 therebetween. The pocket 536 receives a portion of the inner carrier 516. In the illustrative embodiment, the second inner platform lip 535 is shaped to include a notch 541 that holds a tubular seal 554 included in the inner carrier 516 in place relative to the inner carrier 516.

The inner carrier 516 includes a base mount 546, a floating seal 548, a first tubular seal 552, and a second tubular seal 554 as shown in FIG. 11. The base mount 546 is made of metallic materials and is fixed with the support strut 514. The floating seal 548 is located between the base mount 546 and the inner platform 526 of the vane 512 to block the hot gases from flowing between the base mount 546 and the inner platform 526. The first tubular seal 552 is arranged between the base mount 546 and the floating seal 548 to seal between the components and block hot gases from flowing radially inward. The second tubular seal 554 is arranged between the floating seal 548 and the platform lips 533, 535.

The base mount 546 includes a core 556, a first arm 558, and a second arm 560 as shown in FIG. 11. The core 556 is coupled to the support strut 514. The first and second arms 558, 560 extend axially away from the core 556 in a first direction. The second arm 560 is spaced apart radially from the first arm 558 to define a pocket 566 that extends axially into the base mount 546. In the illustrative embodiment, the tubular seal 552 is located in the pocket 566 between the floating seal 548 and the base mount 546.

The first arm 558 is shaped to include a tubular seal channel 568 as shown in FIG. 11. The tubular seal channel 568 is configured to receive the first tubular seal 552 and provide a sealing surface that for the tubular seal 552 to engage, sealing the gap between the base mount 546 and the floating seal 548.

The forward floating seal 548 includes an axially extending flange 582 and a first radially extending flange 584 as shown in FIG. 11. The axially extending flange 582 extends into the pocket 566 and engages the base mount 546. The first radially extending flange 584 extends radially away from the axially extending flange 582 such that floating seal 548 is substantially L-shaped. The radially extending flange 584 engages the inner platform lip 533 to limit movement of the floating seal 548 relative to the base mount 546 and the inner platform 526.

The present disclosure relates to floating seals for sealing gaps between ceramic matrix composite and metallic components. Ceramic matrix composite components may have a coefficient of thermal expansion that is lower than the coefficient of thermal expansion of the metallic materials. This difference in coefficients of thermal expansion may result in varying gaps between the ceramic matrix composite and metallic components.

The ceramic matrix composite components may also have a lower structural strength compared to metallic components. The strength allowables of ceramic matrix composite materials may be an order of magnitude lower than high temperature metallic alloys. As a result, ceramic matrix composite components may be designed into applications, which impart minimal loads onto the components, thereby reducing the stress levels in the ceramic matrix composite materials.

Some other sealing solutions may impose interfacial loads onto the components being sealed. For instance, typical "E" or "W" may be compressed between components on either side of a gap being sealed. As such, the seals may act as springs and may impart a load on the mating components. In other situations, ceramic rope seals or braid seals that impose interfacial loads on the components being sealed may be used. Such seals, may be located in a groove between the components, and crushed on either side of the gap being sealed. The sealing performance of the ceramic rope seal may be dependent on maintaining a significant crush load on the seal. However, the needed crush load on the seal may impart loads on the ceramic matrix composite components, resulting in high stress levels in the components.

The typical "E" and "W" seals, like most other seals, may not be able to handle the large change in compression height, particularly at the elevated temperatures associated with ceramic matrix composite materials. The seals may lose compression in the flight envelope or may relax during long term operation points. In either case, such failure may result in excessive leakage or loss of ability to maintain compression throughout the rest of the operating envelope. The floating seals 48, 50, 248, 348, 448, 548 however, may handle such large relative motions and maintain sealing at all operating envelopes.

Such sealing arrangements between high temperature ceramic matrix composite components and a metallic seal may also result in chemical interaction between the ceramic matrix composite materials and the metallic material of the seal. The chemical interaction may embrittle the metallic seal and/or lower the strength of the ceramic matrix composite component. The chemical interact between the materials may also become worse or increase at higher temperatures.

As such, the present disclosure relates to a floating seal 48, 49, 248, 348, 448, 548 that is configured to seal a gap, which may open and close significantly due to differing coefficients of thermal expansion between the components being sealed. The floating seal 48, 49, 248, 348, 448, 548 may be able to withstand high temperatures and may also impart minimal load onto the ceramic matrix composite component.

In the illustrative embodiment, the floating seal 48, 49, 248, 348, 448, 548 is configured to seal between the inner platform 26, 226, 326, 426, 526 of the ceramic vane 12, 212, 312, 412, 512 and the inner metallic components 14, 214, 314, 414, 514 supporting the vane 12, 212, 312, 412, 512. In some embodiments, the seal 48, 49, 248, 348, 448, 548 may also be configured to provide sealing to the rotor 74.

The present disclosure teaches an inner carrier 16, 216, 316, 415, 516 that includes a floating seal 48, 49, 248, 348, 448, 548 that mates with an axial pocket 66, 67, 266, 366, 466, 566 in one component 46, 246, 346, 446, 546 and engages a lip 33, 34, 233, 333, 433, 533 of the inner platform 26, 226, 326, 426, 526. The floating seal 48, 49, 248, 348, 448, 548 may be forced against the mating component by pressure, thereby sealing the gap between the vane 12, 212, 312, 412, 512 and the metallic component 14, 214, 314, 414, 514.

In the illustrative embodiment of FIG. 9, the floating seal 348 fits within a radial pocket 336 and the axial pocket 366 in the mating components and seals the gap by engaging the sides of the pockets 336, 366. In the illustrative embodiment of FIG. 10, the floating seal 448 fits with a radial pocket 466, engages the lips 433, 435 in the mating components, and seals the gap by engaging the surfaces of the mating components.

In some embodiments, the seal component 48, 49, 248, 348, 448, 548 may be a continuous hoop. The pressure from the inner chamber 40 or chambers 42, 43 may be able to force the seal 48, 49, 248, 348, 448, 548 axially against the wall of the lip 33, 34, 233, 333, 433, 533 of the platform 26, 226, 326, 426, 526. However, the structure of the seal 48, 49, 248, 348, 448, 548 may not be able to expand or contract against the arms 58, 60, 62, 64, 258, 260, 358, 360, 458, 460, 558, 560 within the pocket 66, 67, 266, 366, 466, 566. As such, the continuous hoop may be split to allow for radial movement and better overall sealing.

In the illustrative embodiment of FIG. 12, such an overlap split 55 of the seal 48, 49 is shown in FIG. 12. The overlap split 55 may eliminate line of sight through the split gap, but still allow the hoop to expand and contract, thereby minimizing leakage flows. The overlap split 55 may also enable tighter gaps on the side stepping portions of the split 55 since the gap 55 may not change as the split hoop expands or contract radially.

The overlap split 55 may be axial as shown in the illustrative embodiment. In other embodiments, the overlap split 55 may be radial. In other embodiments, the overlap split 55 may be a combination of axial and radial components (i.e. radial on the radial leg and axial on the axial leg).

In other embodiments, the floating seal 48, 49, 248, 348, 448, 548 may be segmented with minimized gaps or overlaps at both ends of the seal 48, 49, 248, 348, 448, 548. The segments may be pinned in placed to one of the ceramic vane 12, 212, 312, 412, 512 and metallic base mount 46, 246, 346, 446, 546. The pinning of the seal 48, 49, 248, 348, 448, 548 may locate the seal 48, 49, 248, 348, 448, 548 circumferentially and may capture the seal 48, 49, 248, 348, 448, 548 during assembly of the airfoil 10, 210, 310, 410, 510 and assembly within the engine 110. Such an anti-rotation feature may allow the seal 48, 49 to float axially and radially during assembly but prevent circumferential movement of the seal 48, 49.

In the illustrative embodiment of FIGS. 2-8, the airfoil assembly 10 includes two floating seals 48, 49. One floating seal 48 is located at the leading edge or forward side 76 of the vane 12 and the other floating seal 49 is located at the trailing edge or aft side 78 of the vane 12. The two seals 48, 49 may have the same function/arrangement, but may have a slightly different shape. The forward floating seal 48 may include an additional wing 86 or "angel wing" seal. The wing 86 may extend axially forward from the band 80 to create an additional seal with the underside of a blade platform ahead of the ceramic vane 12. In other embodiments, the wing 86 may be integral with the inner metallic structure 46 rather than with the floating seal 48.

In the illustrative embodiment, the inner platform 26 includes radial extensions 33, 34 that engage corresponding radial extensions 84, 85, 94, 96 of the floating seals 48, 49. The radial extensions or lips 33, 34 may minimize machining and enable coatings to be applied to protect the ceramic matrix composite material.

In the illustrative embodiment, the support strut 14 is hollow to allow for a flow of cooling air to be supplied to the inner chamber 40. The flow of cooling air may have a higher pressure than the pressure in the chambers 42, 43. As such, the pressure in the inner chamber 40 pushes the floating seals 48, 49 axially outward relative to the support strut 14. In the illustrative embodiment, the pressure in the inner chamber 40 pushes the axial extending flange 82, 92 of the floating seals 48, 49 into engagement with the arms 60, 64 of the base mount 46. The pressure in the inner chamber 40 also pushes the radial extending flange 84, 94 into engagement with the lip 33, 34.

In other embodiments, the pressure in the chambers 42, 43 is greater than the pressure in the inner chamber 40. As such, the pressure in the chambers 42, 43 pushes the floating seals 48, 49 axially inward towards the support strut 14. In this embodiment, the axially extending flange 82, 92 engages the arm 58, 62 of the base mount 46 and the radially extending flange 85, 96 engages the lip 33, 34.

The radial extensions or inner platform lips 33, 34, 233, 433 formed integral in the inner platform 26, 226, 426 of the vane 12, 212, 412 may significantly reduce the cost of manufacturing the ceramic vane 12, 212, 412, while also improving reliability of the component compared to the pocket arrangement as shown in FIGS. 9 and 11. The single radial extensions 33, 34, 233, 433 may be easier to coat in an environmental barrier coating and may be easier to inspect (i.e. offer a better line of sight on all surface of the extension 33, 34, 233, 433.

In some embodiments, a feature 98 may be added at a location around the circumference of the seal 48, 49 to ensure the seal 48, 49 may not rotate. This anti-rotation feature 98 may be a pin or lug 99 that fits into a hole, slot, notch, or another suitable mating feature 98. In illustrative embodiment, the floating seal 48, 49 may include the anti-rotation notch 98 and the base mount 46 may include the corresponding feature 99. In other embodiments, the anti-rotation feature components 98, 99 may be reversed.

In the illustrative embodiment of FIG. 10, the inner carrier 416 includes an additional split ring seal 452 in conjunction with the floating seal 448. The seal 452 may further improve the sealing performance. The split seal 452 may be a wire hoop or a section of ceramic rope seal in some embodiments. The ceramic rope seal may or may not have metallic sheathing. In other embodiments, the seal 452 may be a canted coil spring. In other embodiments, the additional ring seal 452 may be split such that the seal 452 is free to expand and contract radially so the seal 452 may float with the floating seal 448.

The pressure in the inner chamber 40 may assist in seating both the floating seal 448 and the split ring seal 452. The pressure in the chamber 40 may push the floating seal 448 against the arm 460 within the pocket 466 and push the rope or wire seal 452 against the angled surface or notch 468. The angled surface 468 may create a reaction force with a radial component that forces the seal 452 against opposing surfaces of the radial gap, thereby enabling sealing. The angled surface 468 may also hold the position of the seal 452 during off-loading conditions. In this way, the pressure loading on the split ring seal 452 may have a reaction component that may also help load the extension 482 against the arm 460. The reaction component may also help close the gap, such that the sealing performance may be enhanced.

In the illustrative embodiment of FIG. 10, the pressure in the inner chamber 40 is greater than the pressure in the chambers 42, 43. If the pressure in the chambers 42, 43 is greater than the pressure in the inner chamber 40, then the pressure may force the split ring seal 452 away from the wedge face or notch 468 and out of the gap. Similarly, such an arrangement may not assist in seating the axially extending flange 482 against the arm 458 and may result in the ultimate loss of the rope seal 452 through the gap as the seal 452 deteriorates.

In some embodiments, split ring seals 352, 354 may be arranged between both either one of the axial and radial flanges 382, 384. In the illustrative embodiment of FIG. 9, the inner carrier 316 includes split rings seals 352, 354 between both flanges 382, 384. In this embodiment, the pocket feature 336 is also formed in the vane 312, with the pressure in the inner chamber 40 being greater than the pressure in the chambers 42, 43.

The wedge face or notch 341 in integrated into the floating seal 348 as the radially extending flange 384 is shaped to include the notch 341. Incorporating the notch 341 into the radially extending flange 384 of the floating seal 348 may minimize the manufacturing cost of the ceramic vane 312. However, the inner platform 326 arrangement results in a minimized line of sight into the pocket 336.

The floating seal 48 49, 248, 348, 48, 548 may be made of a high temperature metallic alloy such as high temperature nickel alloy in some embodiments. In the illustrative embodiment, the floating seal 48, 49, 248, 348, 448, 548 is made of ceramic matrix composite materials.

Making the floating seal 48, 49, 248, 348, 448, 548 from ceramic matrix composite materials may reduce the overall weight of the seal 48, 49, 248, 348, 448, 548, while also moving the ceramic matrix composite to metal interface to a cooler region of the engine 110. The cooler the environment for the interface between the ceramic matrix composite to metal materials, the less likely chemical interaction between the materials. Reducing the chemical interaction between the ceramic matrix composite and metal materials may increase the structural strength of the components over the life of the engine 110.

In the illustrative embodiments, the inner carrier 16, 216, 316, 416 516 includes floating seals 48, 49, 248, 348, 48, 548 and a base mount 46, 246, 346, 446, 546. The separate floating seal 48, 49, 248, 348, 448, 548 in conjunction with the base mount 46, 246, 346, 446, 546 includes a radial extension 84, 94, 284, 285, 384, 484, 485, 584 and an axial extension 82, 92 282, 382, 482, 582. In some embodiments, radial extension 384, 584 extends into a radial pocket 336, 536. In some embodiments, the axial extension extends into an axial pocket 66, 266, 366, 466, 566.

In the some embodiments, the split 55 in the floating seal 48, 49, 248, 348, 448, 548 may enable the seal 48, 49, 248, 348, 448, 548 to expand and contract radially. The split 55 may allow the seal 48, 49, 248, 348, 448, 548 to seal against the base mount 46, 246, 346, 446, 546 when pressurized.

In some embodiments, the split 55 may be a simple, straight or angled, cut through the hoop. In other embodiments, the split 55 may include a jog so as to create a circumferential overlap between the two ends of the seal 48, 49, 248, 348, 448, 548. The jog may be used to create an overlap in a single direction (radial or axial). In other embodiments, the job may be complex in that the overlap may be created in both directions.

In some embodiments, the floating seal 48, 49, 248, 348, 448, 548 comprises ceramic matrix composites. As such, the interfacing portion of the ceramic vane 12, 212, 312, 412, 512 with the seal 48, 49, 248, 348, 448, 548 may be an extension to enable the component to be manufactured, inspected, and coated with higher quality.

In the illustrative embodiment, the anti-rotation feature 98 may prevent excessive rotation and wear of the floating seal 48, 49, 248, 348, 448, 548. The anti-rotation feature 98 may be configured to stop circumferential movement, while allowing the seal 48, 49, 248, 348, 448, 548 to float both axially and radially.

In other embodiments, instead of a split hoop, the seal 48, 49, 248, 348, 448, 548 may be a plurality of segments. In such an embodiment, every segment may have an anti-rotation feature 98 to block circumferential rotation of the seal 48, 49, 248, 348, 448, 548.

In the illustrative embodiment, the floating seal 48, 49, 248, 348, 448, 548 may utilize the pressure differential across the seal 48, 49, 248, 348, 448, 548 to locate the seal 48, 49, 248, 348, 448, 548 against the features on the inner platform 26, 226, 326, 426, 526 and the pocket features 66, 67, 266, 366, 466, 566 on the base mount 46, 246, 346, 446, 546. Therefore, the performance of the seal 48, 49, 248, 348, 448, 548 may have several determining factors.

In some embodiments, the performance of the seal 48, 49, 248, 348, 448, 548 may be dependent upon the restriction of the torturous path up one side of the pocket 66, 266, 366, 466, 566, around the end of the flange 82, 282, 382, 482, 582, and outer the other side of the pocket 66, 266, 36, 466, 566. In some embodiments, the restriction of the face-to-face contact between the flange 82, 282, 382, 482, 582 and the side of the pocket 66, 266, 366, 466, 566 may affect the sealing performance.

The contact between the flange 82, 282, 382, 482, 582 and the side of the pocket 66, 266, 366, 466, 566 may be full face-to-face contact like in the illustrative embodiments. In other embodiments, the contact may be against a raised face 489 of limited extent on one of the mating faces. The purpose of this raised face 489 may be to control the contact location. The purpose of the raised face 489 may also be to increase the contact pressure by increasing the area over which the differential pressure acts and minimizing the contact area. The raised face 489 may also manage the bending moments and the stresses in the components.

In some embodiments, when applied to the inner and outer platforms 26, 24 of the vane 12, additional features may be added to the floating seal 48, 49 or the support strut 46 to interface with the adjacent blade or seal segment. In other embodiments, a split rope seal, or wire seal 252 may be added along with one or both of the extensions 333, 334 of the inner platform 326. The additional seal 252 may be split to enable it to expand and contract radially so that the spit seal 252 may move into the correct locating as motivated by the pressure differential.

The split rope seal, or other suitable seal type 252, 352, 354, 452, 552, 554 may be located on the pressure side of the extension 282, 382, 482, 582 such that the pressure encourages the extension 282, 382, 482, 582 to move into the gap between the extension 282, 382, 482, 582 and the pocket 266, 366, 466, 566. In this way, the seal 252, 352, 354, 452, 552, 554 may be captured within the assembly 210, 310, 410, 510 with less of a chance of deterioration and loss.

As wedge face 288, 341, 368, 468, 541, 568 may be located on the pressure side of the split seal 252, 352, 354, 452, 552, 554 (towards the end of the extension 282, 382, 482, 582. The wedge face 288, 341, 368, 468, 541, 568 reacts the pressure loading of the split rope seal 252, 352, 354, 452, 552, 554 such that the wedge face 288, 341, 368, 468, 541, 568 may impart a load through the split seal 252, 352, 354, 452, 552, 554 into the floating seal 248, 348, 448, 548. This imparted load may assist in sealing at both the split wire seal 252, 352, 354, 452, 552, 554 interface and the extension 282, 382, 482, 582 to pocket 266, 366, 466, 566 interface.

In some embodiments, if the ceramic matrix composite vane 312, 512 contains the pocket feature 336, 536, putting the wedge face 341, 541 on the floating seal 348, 548 may be beneficial to the manufacture, inspection, coating, and quality of the ceramic matrix composite vane 312, 512.

In the illustrative embodiment, the airfoil assembly 10, 210, 310 410, 510 may provide a reasonable seal 48, 49, 248, 348, 448, 548 in the difficult sealing area. In the location of the seal 48, 49, 248, 348, 448, 548, the temperature is relatively high (greater than 700 degrees Celsius) and the thermal growth between the materials is relatively great (greater than 0.3 millimeters).

In the illustrative embodiments, the seal 48, 49, 248, 348, 448, 548 may provide better sealing performance than typical "E" or "W" seals in this type of seal application. Other typically used seals may include feather seals. However, feather seals may not perform well (i.e. high leakage rates) and may not be capable of withstanding such high operating temperatures.

In the illustrative embodiments, the floating seals 48, 49, 248, 348, 448, 548 are constructed of ceramic matrix composite materials, which may lower the manufacturing costs and provide higher quality part manufacturing. The floating seals 48, 50, 248, 448 may also enable simplified mating features 33, 34, 233, 433 on the ceramic inner platform 26, 226, 426 that provide better inspection of the components 33, 34, 233, 433 and may be easier to coat in protective coatings.

Additionally, between management of differential pressure, the size of the areas over which the differential pressure acts, and the contact point location of a raised contact pad, the magnitude and location of the seal load may be manipulated to optimize stress within the ceramic vane 12, 212, 312, 412, 512. This manipulation of the seal load may help reduce stresses, which is beneficial due to the low strength capabilities of the ceramic material.

In managing the stress in the ceramic vane 312, 412, the extension pad 389, 489 may be located on the half of the extension 384, 484 closest to the inner platform 326, 426. In some embodiments, the forward side 76 or leading edge of the vane 12

In some embodiments, if contact is limited to the end of the pocket 66, 67, 266, 366, 466, 566, the contact load may have very little bending arm length. This may limit the amount of bending stress resulting from the contact load. However, with the contact pad 389, 489 in this location, the area over which the differential pressure acts may be larger. As a result, the contact load and pressure may increase and improve overall sealing.

Yet, the increased pressure and contact load to the lips 333, 335, 433 may increase the stress within the ceramic vane 312, 412. The differential pressure levels and the contact location may allow the parameters of the seal to be manipulated. The manipulation of the seal may provide an optimum location for the contact pads 389, 489.

In some embodiments, the seals may need compression to generate adequate contact pressure to seal. In large deflection gaps, such seals may result in very high seal compression loads when the gap is small to ensure that there is still adequate compression loads when the gap is large.

Further, when the gap is small and the seal is highly compressed at high temperatures, the resulting creep or failure of the seal may reduce sealing performance. The reduced sealing performance may result in failure of the seal during the operating range and life of the engine.

To further improve sealing at the contact pad 389, 489, the contact pad 389, 489 may be a chordal feature (straight line instead of curved along a radius). The shape of the contact pad 389, 489 may help maintain contact along the entire length even if the mating faces are not parallel.

In some embodiments, the combination of the floating seal 248, 348, 448, 548 with the split seal 252, 352, 354, 452, 552, 554 may result in improved performance (lower leakage rates). The combination may also allow for a more robust floating seal, which provides good sealing performance. The smaller split wire seal 252, 352, 354, 452, 552, 554 may provide additional sealing by managing the effects of seal failure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly for a gas turbine engine, the airfoil assembly comprising
   a ceramic matrix composite vane adapted to interact with hot gases flowing around the airfoil assembly during use of the airfoil assembly, the ceramic matrix composite vane includes an outer platform, an inner platform spaced apart radially from the outer platform relative to an axis, and an airfoil that extends radially between and interconnects the outer platform and the inner platform, the inner platform having a body and a first inner platform lip that extends radially inward from the body, and the airfoil formed to define an interior cavity that extends radially through the airfoil,
   a metallic support strut located in the interior cavity formed in the airfoil and configured to receive force loads applied to the ceramic matrix composite vane by the hot gases during use of the airfoil assembly, and
   an inner carrier coupled with the metallic support strut and adapted to block the hot gases from flowing radially inward toward the axis, the inner carrier includes a metallic base mount fixed with the metallic support strut and a first floating ceramic matrix composite seal located between the metallic base mount and the inner platform to block the hot gases from flowing between the metallic base mount and the inner platform,
   wherein the first floating ceramic matrix composite seal includes a band, an axially extending flange that extends away from the band and engages the metallic base mount, and a first radially extending flange that extends away from the band and engages the first inner platform lip to limit movement of the first floating ceramic matrix composite seal relative to the metallic base mount and the inner platform while allowing for relative thermal growth between the first floating ceramic matrix composite seal, the metallic base mount, and the inner platform,
   wherein the metallic base mount includes a core, a first arm that extends axially away from the core in a first direction, and a second arm that extends axially away from the core in the first direction, the second arm is spaced apart radially from the first arm to define a pocket that extends axially into the metallic base mount, and the axially extending flange of the first floating ceramic matrix composite seal extends into the pocket.

2. The airfoil assembly of claim 1, wherein the first floating ceramic matrix composite seal further includes a second radially extending flange that extends away from the band and the second radially extending flange is spaced apart axially from the first radially extending flange to locate at least a portion of the first inner platform lip between the first radially extending flange and the second radially extending flange.

3. The airfoil assembly of claim 2, wherein the first floating ceramic matrix composite seal further includes a wing that extends from an axial end of the band radially outward and axially away from the first radially extending flange.

4. An airfoil assembly for a gas turbine engine, the airfoil assembly comprising
   a ceramic matrix composite vane adapted to interact with hot gases flowing around the airfoil assembly during use of the airfoil assembly, the ceramic matrix composite vane includes an outer platform, an inner platform spaced apart radially from the outer platform relative to an axis, and an airfoil that extends radially between and interconnects the outer platform and the inner platform, the inner platform having a body and a first inner platform lip that extends radially inward from the body, and the airfoil formed to define an interior cavity that extends radially through the airfoil,
   a metallic support strut located in the interior cavity formed in the airfoil and configured to receive force loads applied to the ceramic matrix composite vane by the hot gases during use of the airfoil assembly, and
   an inner carrier coupled with the metallic support strut and adapted to block the hot gases from flowing radially inward toward the axis, the inner carrier includes a metallic base mount fixed with the metallic support strut and a first floating ceramic matrix composite seal located between the metallic base mount and the inner platform to block the hot gases from flowing between the metallic base mount and the inner platform,
   wherein the first floating ceramic matrix composite seal includes a band, an axially extending flange that extends away from the band and engages the metallic base mount, and a first radially extending flange that extends away from the band and engages the first inner platform lip to limit movement of the first floating ceramic matrix composite seal relative to the metallic base mount and the inner platform while allowing for relative thermal growth between the first floating ceramic matrix composite seal, the metallic base mount, and the inner platform,
   wherein the inner platform includes a second inner platform lip that extends radially inward from the inner platform and is spaced apart axially from the first inner platform lip and the inner carrier further comprises a second floating ceramic matrix composite seal that engages the second inner platform lip and the metallic base mount.

5. The airfoil assembly of claim 4, wherein the second floating ceramic matrix composite seal includes a band, an axially extending flange that extends away from the band of the second floating ceramic matrix composite seal and engages the metallic base mount, and a first radially extending flange that extends away from the band of the second floating ceramic matrix composite seal and engages the second inner platform lip.

6. The airfoil assembly of claim 5, wherein the metallic base mount is formed to include a core, a first arm that extends axially away from the core in a first direction, and a second arm that extends axially away from the core in the first direction, the second arm is spaced apart radially from the first arm to define a first pocket that extends axially into the metallic base mount, and the axially extending flange of the second floating ceramic matrix composite seal extends into the first pocket.

7. The airfoil assembly of claim 6, wherein the metallic base mount includes a third arm that extends axially away from the core in a second direction and a fourth arm that extends axially away from the core in the second direction, the fourth arm is spaced apart radially from the third arm to define a second pocket that extends axially into the metallic base mount, and the axially extending flange of the second floating ceramic matrix composite seal extends into the second pocket.

8. The airfoil assembly of claim 5, wherein the second floating ceramic matrix composite seal further includes a second radially extending flange that extends away from the band of the second floating ceramic matrix composite seal and the second radially extending flange of the second floating ceramic matrix composite seal is spaced apart axially from the first radially extending flange of the second floating ceramic matrix composite seal to locate at least a portion of the second inner platform lip there between.

9. An airfoil assembly comprising
a vane including an outer platform, an inner platform spaced apart radially from the outer platform relative to an axis, and an airfoil that extends radially between the outer platform and the inner platform, the inner platform having a body and an inner platform lip that extends radially inward from the body,
a support strut that extends radially into the airfoil, and
an inner carrier that includes a base mount fixed with the support strut and a rigid floating seal located between the base mount and the inner platform and the floating seal includes a circumferentially extending band, a first flange that extends axially from the band and engages the base mount, and a second flange that extends radially from the band and engages the inner platform lip,
wherein the base mount includes a core, a first arm that extends away from the core in a first direction, and a second arm that extends away from the core in the first direction, the second arm is spaced apart from the first arm to define a pocket that extends into the base mount, and the second flange of the floating seal extends into the pocket.

10. The airfoil assembly of claim 9, wherein the floating seal further includes a third flange that extends radially from the band and the third flange is spaced apart axially from the second flange to locate at least a portion of the inner platform lip between the second flange and the third flange.

11. The airfoil assembly of claim 9, wherein the inner carrier further includes a first tubular seal located in the pocket between the first flange and the base mount.

12. The airfoil assembly of claim 11, wherein the inner carrier further includes a second tubular seal located between the inner platform lip and the first flange of the floating seal.

13. The airfoil assembly of claim 9, wherein the floating seal is substantially L-shaped.

14. The airfoil assembly of claim 9, wherein the floating seal is substantially J-shaped.

15. The airfoil assembly of claim 9, wherein the second flange includes a circumferentially extending wall and a ridge that extends axially away from the wall and engages the inner platform lip to space the wall apart from the inner platform lip.

16. The airfoil assembly of claim 9, wherein the floating seal further includes a wing that extends away from a terminal end of the band radially and axially.

17. The airfoil assembly of claim 9, wherein the floating seal includes an anti-rotation feature that engages with the base mount to block rotation of the floating seal about the axis.

18. The airfoil assembly of claim 9, wherein the floating seal includes a first end and a second end spaced apart circumferentially from the first end relative to the axis to define a gap therebetween, and wherein the floating seal extends circumferentially about the axis such that the first end overlaps the second end.

* * * * *